(No Model.)
J. T. LEIGHTON.
ELECTRO MAGNETIC SPECTACLES.
No. 381,260. Patented Apr. 17, 1888.
FIG. I
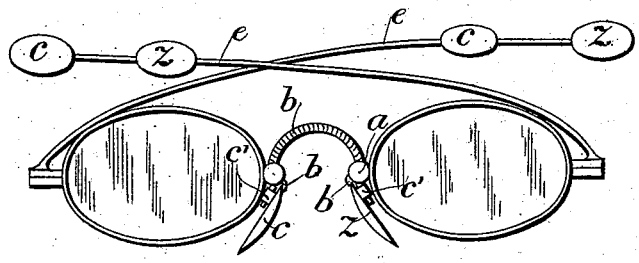
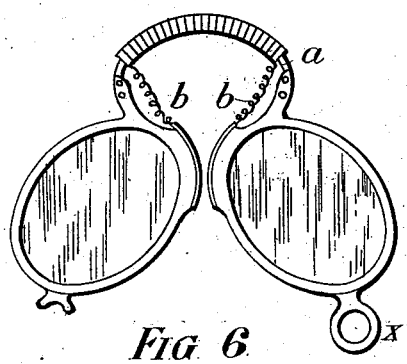
FIG. 6
FIG. 2.
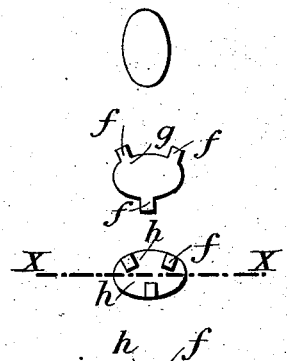
FIG. 3.
FIG. 4.
FIG. 5.
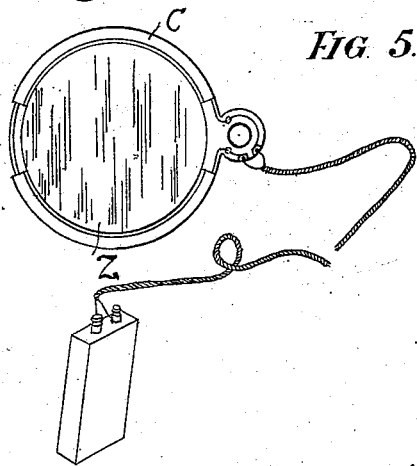
FIG 7
WITNESSES
Chas. Amon.
J. H. Mindle
INVENTOR.
John T. Leighton.
Per James H. Lancaster,
Attorney.
N. PETERS, Photo-Lithographer, Washington, D. C.

UNITED STATES PATENT OFFICE.

JOHN TAYLOR LEIGHTON, OF EDINBURGH, COUNTY OF EDINBURGH, SCOTLAND.

ELECTRO-MAGNETIC SPECTACLES.

SPECIFICATION forming part of Letters Patent No. 381,260, dated April 17, 1888.

Application filed July 16, 1887. Serial No. 244,545. (No model.) Patented in England September 2, 1886, No. 11,179.

*To all whom it may concern:*

Be it known that I, JOHN TAYLOR LEIGHTON, a subject of the Queen of Great Britain, and a resident of Edinburgh, in the county of Edinburgh, Scotland, have invented certain new and useful Improvements in Electro-Magnetic Spectacles, (for which I have obtained a patent in Great Britain, No. 11,179, dated September 2, 1886,) of which the following is a full, clear, and exact specification.

My invention relates to improvements in frames for spectacles, eyeglasses, eye-preservers, and the like; and it consists in providing two plates, disks, or pieces of metals, one of copper and one of zinc, or any other two metals, one of which is electro-positive to the other. The plates or disks above mentioned are attached to the bridge or nose-piece of the frame in such a manner and position as to be capable of free adjustment, (or be removed altogether, if required,) so as to rest comfortably upon or at either side of the nose of the wearer.

The metal plates or disks are electrically connected by the bridge or nose-piece itself, unless made for use as a single eyeglass, or independently by means of a platinum or copper wire or other suitable metallic conductor; a groove being preferably provided in the bridge or nose-piece for receiving said wire or conductor; or the wire may be coiled around the bridge or nose-piece, thus converting the bridge into an electro-magnet, in which case the wire aforesaid would be insulated with silk or other suitable material. I also provide similar disks or plates of copper and zinc to be placed on or near the ends of the arms of the spectacles and connected electrically by means of the frame or otherwise. The metallic disks or plates may, however, be placed in any suitable and convenient position, and, if necessary, the plates and wire may be suitably insulated from the frame, and, further, the plates upon the bridge may be independent and insulated from the plates upon the ends of the arms, thus forming three circuits through which the current may flow. In addition I may make the frames of the spectacles magnetic wholly or in part. Thus, if it is desired to have the bridge only magnetic, I insulate it from the other parts of the frame by the insertion of some non-magnetic substance, which, while being non-magnetic, may be, if required, a conductor of electricity; also, if it is desired that the arms alone be magnetized, they may be insulated at the joints in a similar manner from the other parts of the frame; but I do not make the permanent magnetism of the frames an essential part of my invention, the magnetism induced in the iron of the frame being far more preferable and effective than the variable magnetism of permanent magnets. The metallic plates or disks may also be used as electrodes for conducting a current from a battery or from the secondary wire of an induction-coil or other external source of electricity. In this manner, according to my invention, a gentle current of electricity is generated by the action of the moisture of the flesh upon the metallic disks or plates which form the elements of the voltaic pile, and with or without the magnetism of the frame exercises a curative and strengthening influence upon the eyes, temples, nerves, and muscles in connection therewith.

In the drawings, Figure 1 represents a general view of the spectacle-frames having the electrical contrivances connected therewith. Fig. 2 represents a detached detailed view of the metallic plates connected with the nose-piece. Figs. 3 and 4 represent the metallic plates connected with the arms of the spectacles. Fig. 5 represents a section taken on line $x\ x$ of Fig. 4. Fig. 6 represents a general view of the ordinary eyeglasses. Fig. 7 shows a single eye-glass having electrodes partially or wholly outside the frame and connected with a small battery.

Similar letters refer to similar parts throughout the drawings.

$a$ represents the nose-piece or bridge, which in this instance is wound with an insulated electrical conductor, $b$. The lower ends of the bridge are connected with the insulated studs $c'$, to which are properly secured the metallic plates $c\ z$, which are electrically connected with the arms $e$ or frame of the spectacles. I may provide instead of the single copper and zinc disks, when greater power is required, compound ones, each composed of a thin plate of copper and one of zinc placed flat on each other and having between them some thin absorbent substance—such as cloth, fustian, or paper—or other suitable substance which has been previously saturated with a solution of chloride of zinc or other suitable exciting-liquid. The plates may be clamped or fastened together by means of small projections or ears on one or the other of the plates and turned over the edge of the other plate, so as to hold them securely together, care being taken to separate them from actual contact by means of a layer of the cloth or otherwise. $f$ shows the projections or ears on plate $g$ folded over the other plate, $h$, (see Fig. 4,) so as to bind them. These compound plates or cells will be placed in the same position as the single ones, the copper and zinc resting on the skin alternately, and the other side fastened to the frame in the same way.

The saturated material, $i$, between the plates is of course allowed to dry, the moisture of the skin being sufficient to moisten it, or may be moistened before wearing with water or by any other exciting-liquid.

Having thus described my invention, what I claim as new, and desire to secure by Letters Patent, is—

1. The combination, with the frame of spectacles or eyeglasses, of the bridge $a$, composed of magnetic metal wound with the insulated electrical conductor $b$, the ends of the said bridge connected with the studs of insulating material, $c'$, the metallic plates $c\ z$, secured to said studs $c'$, each of said plates $c\ z$ electrically connected with the electrical conductor $b$, substantially as shown and described.

2. The combination, with the frame of spectacles or eyeglasses, of the electrical terminals secured thereto and insulated one from the other, each of said terminals adapted to be electrically connected with a source of electricity, substantially as shown and described.

In testimony that I claim the foregoing I have hereunto set my hand this 24th day of June, 1887.

JOHN TAYLOR LEIGHTON.

Witnesses:
   ADAM TURNBULL, *Solicitor*,
   J. A. HAROLD NAPIER, *Law Clerk*,
     *Both of No. 6 George Street, Edinburgh.*